(12) United States Patent
Fischer

(10) Patent No.: US 6,773,030 B2
(45) Date of Patent: Aug. 10, 2004

(54) AIR BAG WITH VENT

(75) Inventor: Kurt F. Fischer, Oxford, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/202,597

(22) Filed: Jul. 24, 2002

(65) Prior Publication Data

US 2004/0017069 A1 Jan. 29, 2004

(51) Int. Cl.$^7$ .............................................. B60R 21/30
(52) U.S. Cl. ...................................................... 280/739
(58) Field of Search ................................ 280/734, 736, 280/739, 743.2

(56) References Cited

U.S. PATENT DOCUMENTS

| | | | |
|---|---|---|---|
| 5,217,249 A | * | 6/1993 | Kokeguchi ............... 280/728.1 |
| 5,246,250 A | | 9/1993 | Wolanin et al. |
| 5,405,166 A | | 4/1995 | Rogerson |
| 5,560,649 A | * | 10/1996 | Saderholm et al. ...... 280/743.1 |
| 5,695,214 A | | 12/1997 | Faigle et al. |
| 5,853,191 A | * | 12/1998 | Lachat ..................... 280/730.2 |
| 5,931,497 A | * | 8/1999 | Fischer .................... 280/743.1 |
| 6,290,257 B1 | | 9/2001 | Bunce et al. |
| 6,390,501 B1 | | 5/2002 | Greib et al. |
| 6,592,146 B2 | * | 7/2003 | Pinsenschaum et al. . 280/743.2 |

* cited by examiner

*Primary Examiner*—Thomas Price
(74) *Attorney, Agent, or Firm*—Tarolli, Sundheim, Covell & Tummino L.L.P.

(57) ABSTRACT

An inflatable vehicle occupant protection device (10) has a vent panel (40) defining a first vent opening (42) for enabling flow of inflation fluid out of the device. A vent strap (60) has a second vent opening (72) movable relative to the first vent opening (42). The vent strap (60) has opposite ends (62, 66) that are fixed when the protection device (10) is in the deflated condition. The vent strap (60) has slack (80) due to the length of the strap being greater than the distance between the locations where its opposite ends (62, 66) are fixed. One of the ends (66) of the vent strap (60) moves as the protection device (10) is inflated to remove the slack (80) and move the second vent opening (72) relative to the first vent opening (42).

11 Claims, 4 Drawing Sheets

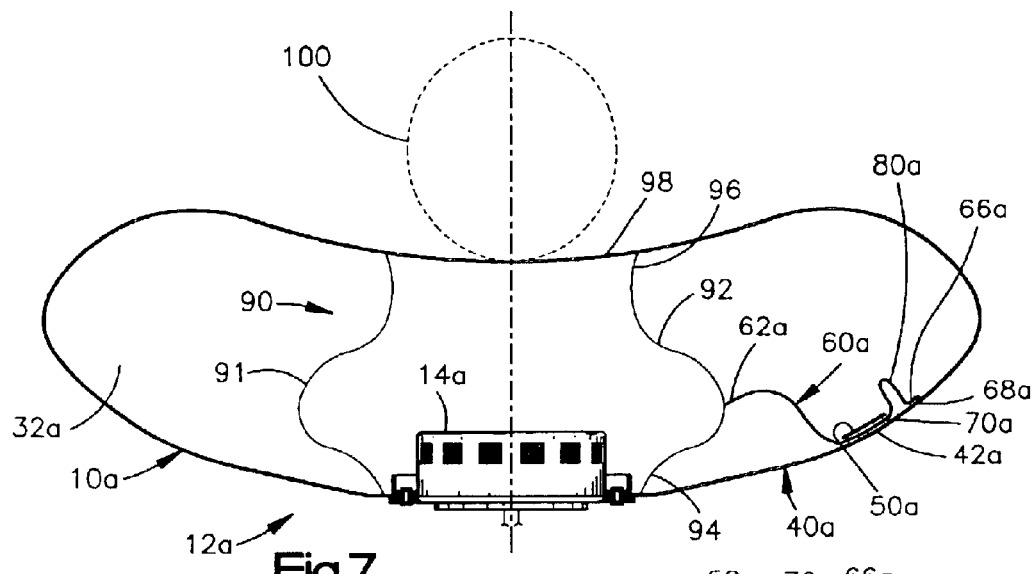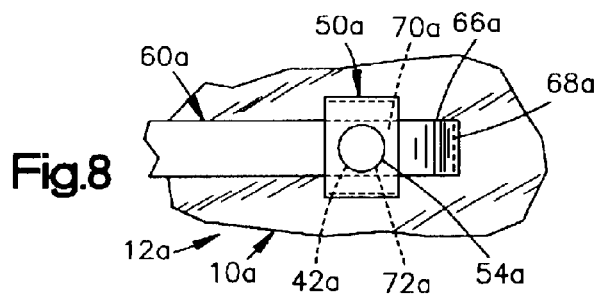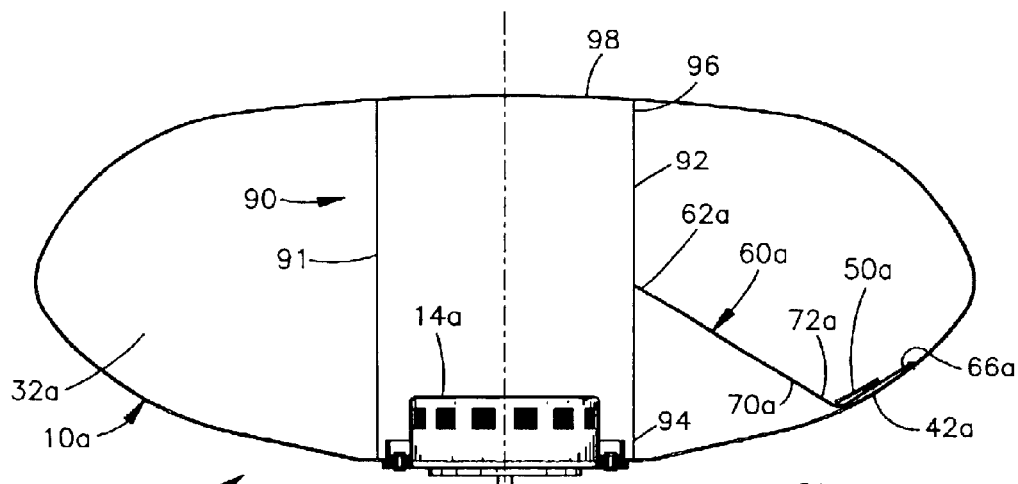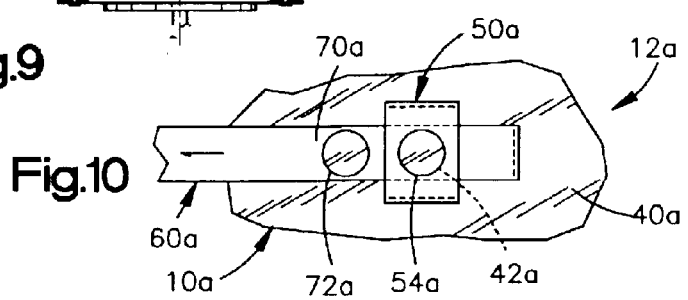

US 6,773,030 B2

AIR BAG WITH VENT

BACKGROUND OF THE INVENTION

The present invention relates to a vehicle occupant protection apparatus. In particular, the present invention relates to an air bag having a vent that can be selectively opened to discharge inflation fluid.

DESCRIPTION OF RELATED ART

It is known to provide an air bag with a vent. The vent opens, or is uncovered, when the air bag inflates to help protect a vehicle occupant, to discharge inflation fluid from the inflated air bag. In some air bags, the vent may be selectively opened depending on sensed factors, for example, whether the occupant's seat belt is buckled. U.S. Pat. No. 6,290,257 shows one such air bag. In other air bags, such as the one shown in U.S. Pat. No. 5,405,166, the vent is formed as two openings that are initially aligned so that the vent is initially open and then closes after the internal bag pressure reaches a predetermined amount.

SUMMARY OF THE INVENTION

The present invention relates to a vehicle occupant protection apparatus comprising an inflatable vehicle occupant protection device having a deflated condition and an inflated condition. The device has a vent panel defining a first vent opening for enabling flow of inflation fluid out of the device. The apparatus includes a vent strap having a second vent opening movable relative to the first vent opening. The vent strap has opposite ends that are fixed when the protection device is in the deflated condition. The vent strap has slack due to the length of the strap being greater than the distance between the locations where its opposite ends are fixed. One of the ends of the vent strap moves as the protection device is inflated to remove the slack and move the second vent opening relative to the first vent opening.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 7 is a view similar to FIG. 1 of a portion of a vehicle occupant protection apparatus including an inflatable vehicle occupant protection device in accordance with a second embodiment of the present invention, showing the vent open;

FIG. 8 is an enlarged schematic view of a portion of the inflatable device of FIG. 7;

FIG. 9 is a view similar to FIG. 7 showing the protection device in an inflated condition with the vent closed; and FIG. 10 is a view similar to FIG. 8 of a portion of the device of FIG. 9.

DETAILED DESCRIPTION OF THE INVENTION

Figure 1:
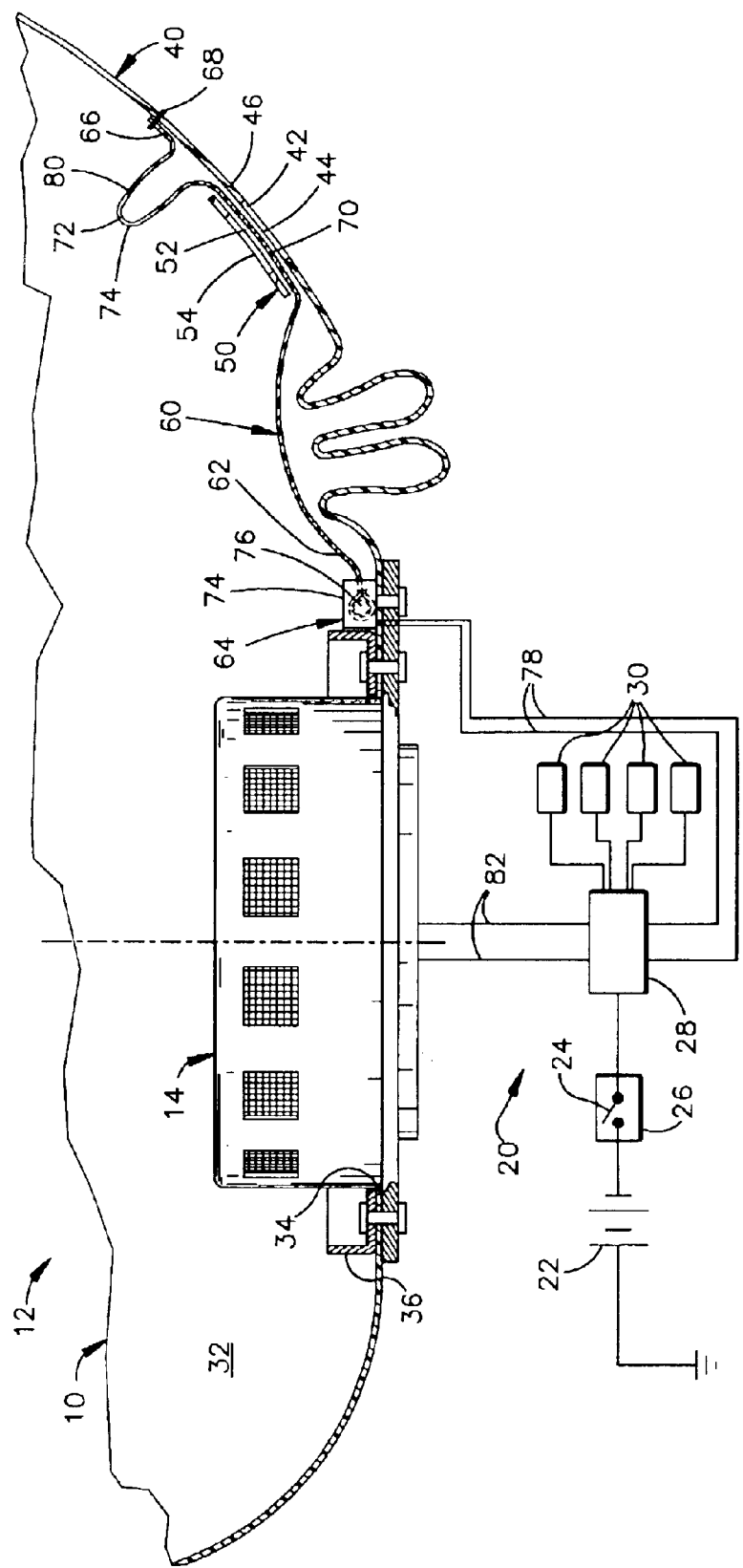
FIG. 1 is a sectional view of a portion of a vehicle occupant protection apparatus including an inflatable vehicle occupant protection device in accordance with the present invention.

The present invention relates to a vehicle occupant protection apparatus. In particular, the present invention relates to an air bag having a vent that can be selectively opened to discharge inflation fluid. As representative of one embodiment of the present invention, FIG. 1 illustrates a portion of an inflatable vehicle occupant protection device in the form of an air bag 10. Other vehicle occupant protection devices that can be used in accordance with the invention include, for example, inflatable seat belts, inflatable knee bolsters, inflatable head liners, inflatable side curtains, and knee bolsters operated by inflatable air bags.

The air bag 10 forms part of a vehicle occupant protection apparatus 12. The apparatus 12 includes an inflator 14 for inflating the air bag 10. The inflator 14 may contain a stored quantity of pressurized inflation fluid and an ignitable material for heating the inflation fluid. The apparatus 12 alternatively could include an inflator 14 that uses the combustion of gas generating material to generate inflation fluid in the form of gas to inflate the air bag 10, or an inflator that contains only a stored quantity of pressurized inflation fluid for inflating the air bag.

The apparatus 12 includes vehicle electric circuitry indicated schematically at 20 (FIG. 1). The vehicle electric circuitry 20 controls the operation of the inflator 14. The vehicle electric circuitry 20 includes a power source 22, which is preferably the vehicle battery and/or a capacitor, and a normally open switch 24. The switch 24 is part of a collision sensor 26, which senses a condition indicating the occurrence of a vehicle collision. The collision-indicating condition may comprise, for example, sudden vehicle deceleration caused by a collision. The vehicle electric circuitry 20 further includes a controller, or control module, 28 for controlling the operation of the vehicle electric circuitry, and a sensor assembly 30.

The sensor assembly 30 includes one or more sensors that generate one or more control signals useful in determining whether to inflate the air bag 10 with maximum speed and force when a vehicle collision is sensed. For example, the sensor assembly 30 may include an occupant position sensor that generates a control signal indicative of the position of a vehicle occupant in the interior of a vehicle. The sensor assembly 30 may also include a buckle switch for generating a control signal indicative of a buckled or unbuckled condition of a seat buckle assembly of the vehicle. The sensor assembly 30 may also include one or more of the following: a sensor that senses the presence of a rearward-facing child seat, a weight sensor, a belt tension sensor, an occupant size sensor, a module temperature sensor, or a crash severity sensor.

The air bag 10 is preferably made from a flexible fabric material, such as woven nylon. The air bag 10 can alternatively be made from a non-woven material, such as plastic film. The air bag 10 has a generally pillow-shaped configuration when fully inflated and is designed for a driver-side application. The invention is applicable to air bags 10 that are used in other locations, for example, passenger side air bags or side impact air bags.

The air bag 10 defines an inflation fluid volume 32 for receiving inflation fluid from the inflator 14. The air bag 10 has an inflation fluid opening 34 for receiving inflation fluid from the inflator 14 to inflate the air bag 10. The air bag 10 is secured to the inflator 14 by a retainer or retaining ring shown partially at 36. The assembly of the air bag 10, retainer 36, and inflator 14 is fixed in position in the vehicle by, for example, a mounting plate (not shown).

A portion of the air bag 10 has a vent for discharging inflation fluid from the inflation fluid volume 32 of the air bag 10. In the illustrated embodiment, the air bag portion is a vent panel 40 having a first vent opening 42. The first vent opening 42 has a circular configuration centered on a point 44. The first vent opening 42 is defined by a portion 46 of the vent panel 40 that extends around and encloses the first vent opening.

The apparatus 12 includes a strap retainer 50 disposed adjacent the first vent opening 42, on the interior of the vent panel 40. The strap retainer 50 may be made from the same flexible fabric material as the air bag 10. In the illustrated embodiment, the strap retainer 50 is a short piece of material that is sewn to the inside of the vent panel 40, leaving a small gap 52 between them. The strap retainer 50 has an opening 54 that is aligned with the first vent opening 42 in the vent panel 40, so that inflation fluid can flow out of the inflation fluid volume 32 through the two openings. The opening 54 in the strap retainer 50 is preferably the same size, or about the same size, as the first vent opening 42 in the vent panel 40.

The apparatus 10 includes a vent member for selectively closing and opening the first vent opening 42 in the air bag 10. Vent members in accordance with the present invention may take many different forms. In the illustrated embodiment, the vent member is a vent strap 60, which is a narrow, elongate piece of material. The vent strap 60 may be made from the same material as the air bag 10, or may be made from a different material.

The vent strap 60 has a first end portion 62 that is fixed to a holding mechanism 64 adjacent the inflator 14, in a manner described below. An opposite second end portion 66 of the vent strap 60 is fixed to the vent panel 40 by sewing with a stitching section 68 adjacent the first vent opening 42 in the air bag 10. The first vent opening 42 is located between the stitching section 68 and the inflator 14.

Figure 4:
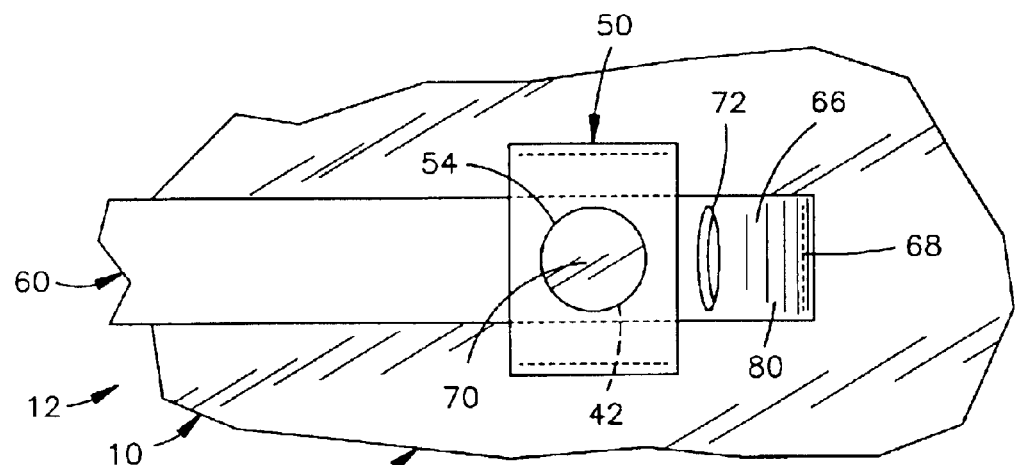
FIG. 4 is a schematic view of a portion of the inflatable device of FIG. 1, enlarged to show the vent closed.

The vent strap 60 includes an intermediate portion, or control portion 70, disposed intermediate the first and second end portions 62 and 66. The control portion 70 of the vent strap 60 is disposed adjacent the first vent opening 42 in the air bag. The control portion 70 of the vent strap 60 is movable by sliding through the gap 52 between the strap retainer 50 and the vent panel 40 of the air bag 10, as can be seen from a comparison of FIGS. 1 and 2 and a comparison of FIGS. 4 and 5.

Figure 2:
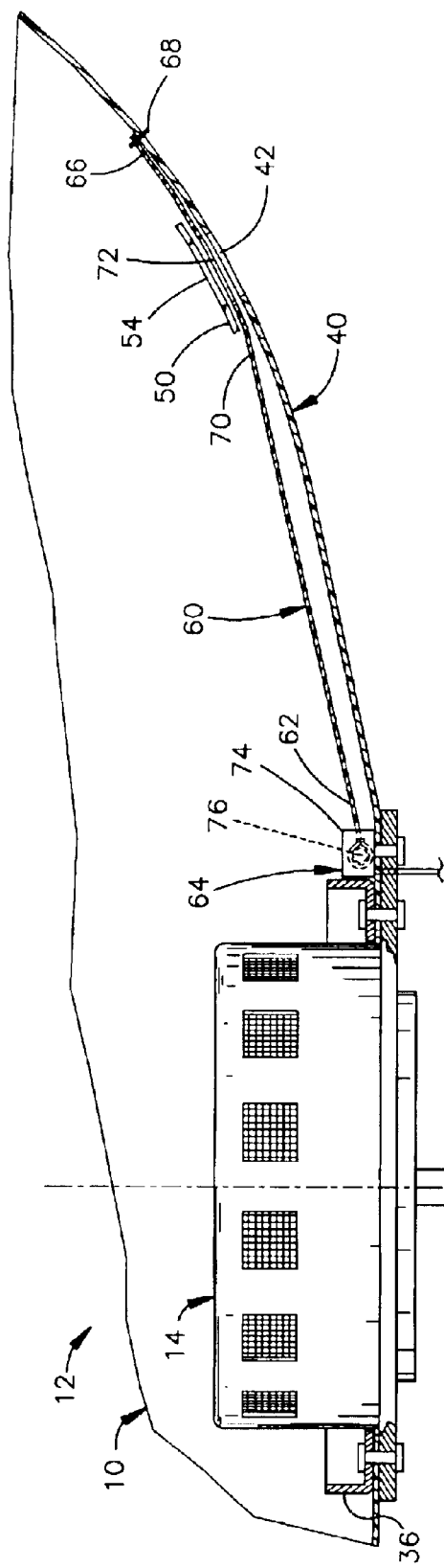
FIG. 2 is a view similar to FIG. 1 showing the protection device in an inflated condition with the vent open.

The control portion 70 of the vent strap 60 defines a second vent opening 72 (FIG. 2). The second vent opening 72 has a circular configuration centered on a point 74, and is preferably the same size, or about the same size, as the first vent opening 42 in the vent panel 40. The control portion 70 of the vent strap 60 extends around and encloses the second vent opening 72.

Figure 5:
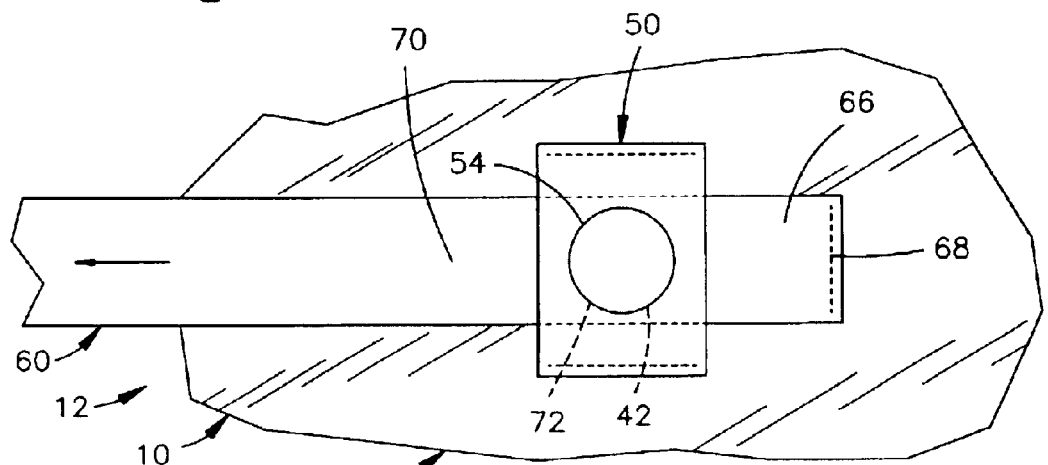
FIG. 5 is an enlarged schematic view similar to FIG. 4 of a portion of FIG. 2 showing the vent open.

The vent strap 60 has a first position relative to the vent panel 40, as illustrated in FIGS. 2 and 5, in which the vent is open when the air bag 10 is inflated. Specifically, when the vent strap 60 is in the first position, the second vent opening 72 in the vent strap 60 is aligned with and overlies the first vent opening 42 in the vent panel 40. The alignment of the first and second vent openings 42 and 72 enables flow of inflation fluid out of the air bag 10 through the first vent opening 42.

Figure 3:
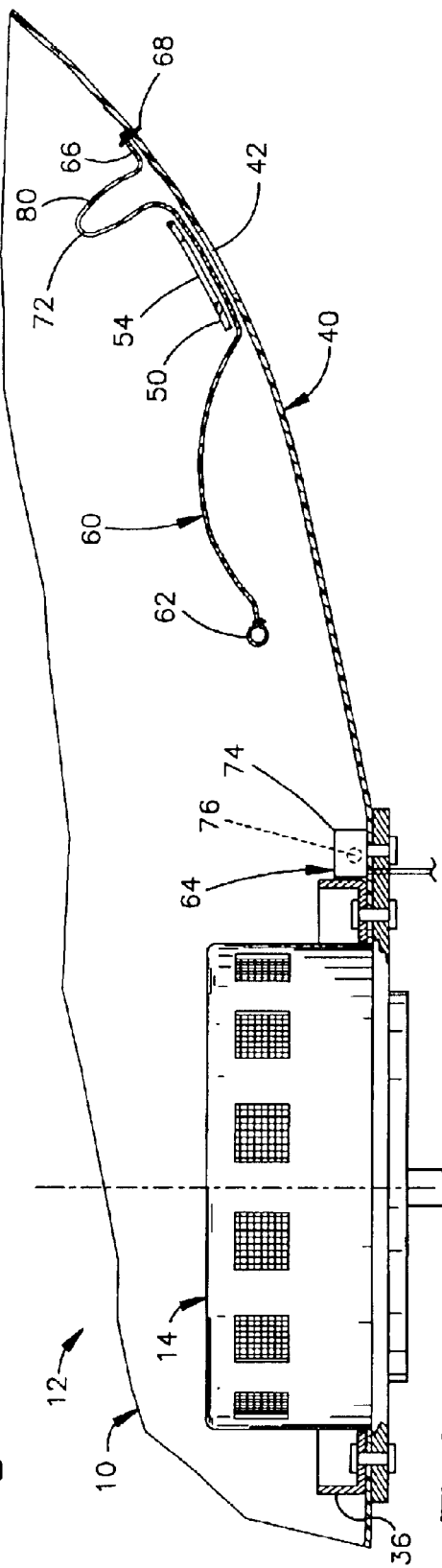
FIG. 3 is a view similar to FIG. 1 showing the protection device in an inflated condition with the vent closed.
Figure 6:
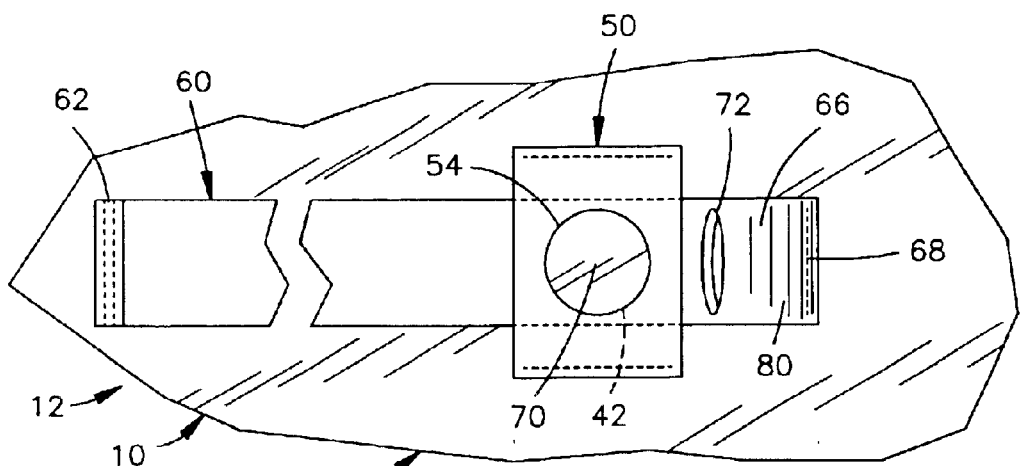
FIG. 6 is an enlarged schematic view similar to FIG. 4 of a portion of FIG. 6 showing the vent closed.

The vent strap 60 has a second position relative to the vent panel 40, as illustrated in FIGS. 3 and 6, in which the vent is closed when the air bag 10 is inflated. Specifically, when the vent strap 60 is in the second position, the second vent opening 72 in the vent strap is spaced laterally from and not aligned with the first vent opening 42 in the vent panel 40. As a result, the material of the control portion 70 of the vent strap 60 overlies the first vent opening 42, and blocks flow of inflation fluid out of the air bag 10 through the first vent opening.

The holding mechanism 64, which forms part of the occupant protection apparatus 12, is located adjacent to the inflator 14. The holding mechanism 64 is fixed in position relative to the inflator 14, and is thus a fixed portion of the apparatus 12. The holding mechanism 64 could take a form other than that shown in the drawings. In the illustrated embodiment, the holding mechanism 64 includes a solenoid 74 having a movable pin or part 76. The first end portion 62 of the vent strap 60 is looped around, or otherwise connected with or fixed to, the pin 76 of the solenoid 74. The solenoid 74 is electrically actuatable over lead wires 78 (FIG. 1). The lead wires 78 are connected with the controller 28 of the vehicle electric circuitry 20. Upon actuation of the solenoid 74, the pin 76 is movable in a direction into and out of the plane of the paper, as viewed in FIG. 3, to release the first end portion 62 of the vent strap 60 for movement away from the inflator 14.

FIG. 1 shows the air bag 10 in a deflated and unfolded condition, with the vent panel 40 of the air bag 10 spaced apart from the holding mechanism 64. It should be understood that when the air bag 10 is in a deflated folded condition, the vent panel 40 of the air bag may be closer to or folded adjacent the holding mechanism 64. In any case, there is a substantial amount of slack 80 in the vent strap 60. The slack 80 is present because the length of the vent strap 60 is greater than the distance between the location where the first end portion of the vent strap is fixed to the holding mechanism 64, and the location where the second end portion 66 of the vent strap is fixed to the vent panel 40. In the illustrated embodiment, the slack 80 is provided by a portion of the vent strap 60 that curls up (as best seen in FIGS. 1 and 3) between the strap retainer 50 and the permanent stitching section 68. The slack 80 is not provided by sewing the strap 60 to the vent panel 40 with tear stitching so as to temporarily shorten the strap until the air bag 10 is pressurized beyond a predetermined amount, at which point the tear stitching would release and the strap would extend in length.

If a collision-indicating condition sensed by the collision sensor 26 indicates the occurrence of a collision for which inflation of the air bag 10 may be desired to help protect the occupant of the vehicle, the switch 24 in the collision sensor 26 closes. The controller 28 determines, on the basis of inputs from the sensor assembly 30, whether the air bag 10 should be inflated and, if so, whether the vent 42 should be opened. If the air bag 10 is to be inflated, the controller 28 transmits an actuation signal to the inflator 14 over lead wires 82. When the inflator 14 is actuated, it emits a large volume of inflation fluid into the inflation fluid volume 32 of the air bag 10. The air bag inflates, as shown in FIGS. 2 and 3.

If a determination is made by the controller 28 that the vent 42 is not to be opened, the solenoid 74 is actuated with a signal over the lead wires 78. The actuation of the solenoid 74 causes the pin 76 to be moved to a position in which it no longer holds the first end portion 62 of the vent strap 60 against movement away from the inflator 14.

As the air bag 10 inflates thereafter, the vent panel 40 and the second end portion 66 of the vent strap 60, which is sewn to the vent panel, move away from the holding mechanism 64. Because the first end portion 62 of the vent strap 60 is not held by the holding mechanism 64, the entire vent strap moves away from the holding mechanism 64 and the inflator 14, along with the vent panel 40 and the strap retainer 50. Because the entire vent strap 60 moves bodily with the vent panel 40, there is no significant force placed on the vent strap that would cause it to move relative to the vent panel. Specifically, there is no significant amount of tensile force placed on the vent strap 60 that would cause the slack 80 in the vent strap to be taken out. Therefore, the vent strap 60 remains in position relative to the vent panel 40, with the material of the control portion 70 covering the first vent opening 42 in the vent panel. The vent 42 remains covered, or closed.

If, on the other hand, the controller 28 determines that the vent 42 should be opened, the solenoid 74 is not actuated. The holding mechanism 64 holds the first end portion 62 of the vent strap 60 against movement away from the holding mechanism and the inflator 14.

As the air bag 10 inflates thereafter, the vent panel 40 moves away from the holding mechanism 64. The force of movement of the vent panel 40 is transmitted into the second end portion 66 of the vent strap 70 through the stitching section 68, attempting to pull the vent strap away from the holding mechanism 64. Because the first end portion 62 of the vent strap 60 is held by the pin 76, the tensile force on the vent strap increases to a level at which the slack 80 is removed from the vent strap and the vent strap is caused to pull through the strap retainer 50. As this occurs, the second vent opening 72 in the vent strap 60 becomes aligned with the first vent opening 42 in the vent panel 40, as seen in FIGS. 2 and 5. The vent 42 is uncovered or opened. The vent 42 opens to an open condition to permit flow of pressurized fluid out of the inflation fluid volume 32 of the air bag 10, through the vent.

FIGS. 7–10 illustrate a portion of a vehicle occupant protection apparatus 12a in accordance with a second embodiment of the invention. Parts of the apparatus 12a that are similar or identical in function to corresponding parts of the apparatus 12 (FIGS. 1–6) are given the same reference numerals with the suffix "a" attached.

The apparatus 12a includes an inflatable vehicle occupant protection device in the form of an air bag 10a. The air bag 10a is similar in construction to the air bag 10 and includes a first vent opening 42a. The air bag 10a also includes a tether 90, that is, an internal device for controlling and/or limiting the amount of inflation of the air bag. In the illustrated embodiment, the tether 90 includes two tether straps 91 and 92 on opposite sides of the inflator 14a. The tether straps 91 and 92 are shown as individual, separate straps, but could alternatively be part of one fabric loop. An inner end portion 94 of the tether strap 92 is fixed adjacent the inflator 14a. An outer end portion 96 of the tether strap 92 is connected with an outer panel 98 of the air bag 10a. When the air bag 10a is in the deflated condition shown in FIG. 7, the tether strap 92 is not pulled tight. When the air bag 10a inflates more fully, as shown in FIG. 9, the tether strap 92 is pulled tight.

The apparatus 12a includes a vent member for selectively closing and opening the first vent opening 42a in the air bag 10a. Vent members in accordance with the second embodiment of the invention may take many different forms. In the illustrated embodiment, the vent member is a vent strap 60a, like the vent strap 60 (FIGS. 1–6).

The vent strap 60a has a first end portion 62a that is fixed to the tether strap 92. The fixation of the vent strap 60a to the tether strap 92 is preferably accomplished by sewing. The first end portion 62a of the vent strap 60a is fixed to the tether strap 92 at a location intermediate the ends of the tether strap.

An opposite second end portion 66a of the vent strap 60a is fixed to the vent panel 40a of the air bag 10a by sewing with a stitching section 68a adjacent the first vent opening 42a in the air bag 10a. The first vent opening 42a is located between the stitching section 68a and the inflator 14a.

The vent strap 60a includes an intermediate portion, or control portion 70a, disposed intermediate the first and second end portions 62a and 66a. The control portion 70a of the vent strap 60a is disposed adjacent the first vent opening 42a in the air bag. The control portion 70a of the vent strap 60a is movable by sliding through the gap between a strap retainer 50a and the vent panel 40a of the air bag 10a.

The control portion 70a of the vent strap 60a defines a second vent opening 72a (FIGS. 8 and 10). The second vent opening 72a has a circular configuration and is preferably the same size, or about the same size, as the first vent opening 42a in the vent panel 40a. The control portion 70a of the vent strap 60a extends around and encloses the second vent opening 72a.

The vent strap 60a has a first position relative to the vent panel 40a, as illustrated in FIGS. 7 and 8, in which the vent 42a is open. Specifically, when the vent strap 60a is in the first position, the second vent opening 72a in the vent strap is aligned with and overlies the first vent opening 42a in the vent panel 40a. The alignment of the first and second vent openings 42a and 72a enables flow of inflation fluid out of the air bag 10a through the first vent opening 42a.

The vent strap 60a has a second position relative to the vent panel 40a, as illustrated in FIGS. 9 and 10, in which the vent 42a is closed. Specifically, when the vent strap 60a is in the second position, the second vent opening 72a in the vent strap is spaced laterally from and not aligned with the first vent opening 42a in the vent panel 40a. As a result, the material of the control portion 70a of the vent strap 60a overlies the first vent opening 42a, and blocks flow of inflation fluid out of the air bag 10a through the first vent opening.

The vent strap 60a has a substantial amount of slack 80a in it when the air bag 10a is deflated or only partially inflated, as shown in FIGS. 7 and 8. This slack 80a is disposed between the retainer 50a and the stitching section 68a. The vent strap 60a is in the first position whenever the tether strap 92 is not extended enough to pull the slack 80a out of the vent strap.

The air bag 10a is inflatable by the inflator 14a upon receipt of an actuation signal as described above with reference to a the first embodiment of the invention. When the inflator 14a is actuated, it emits a large volume of inflation fluid into the inflation fluid volume 32a of the air bag 10a. The air bag 10a inflates.

If the air bag 10a inflates by less than a certain amount (FIGS. 7 and 8), the outer panel 98 moves away from the inflator 14a by less than a predetermined amount. This might happen, for example, if the air bag 10a when inflating contacts a vehicle occupant (as shown schematically at 100 in FIG. 7) who is positioned relatively close to the inflator 14a. In this case, the tether strap 92 is not stretched out and does not pull on the vent strap 60a sufficiently to remove the slack 80a from the vent strap. The vent strap 60a remains in the first condition. The second vent opening 72a in the vent strap 60a stays in alignment with the first vent opening 42a in the vent panel 40a, and the vent remains open, enabling flow of inflation fluid out of the air bag 10a through the first vent opening. This venting of the air bag 10a can reduce the force and pressure with which the air bag inflates.

If the air bag 10a inflates by more than a certain amount (FIGS. 9 and 10), the outer panel 98 moves away from the inflator 14a by a predetermined amount. This movement causes the tether strap 92 to be tensioned, as shown in FIG. 9. At the same time, the vent panel 40a moves away from the inflator 14a because of inflation of the air bag 10a. The distance between the first end portion 62a of the vent strap 60a and the second end portion 66a of the vent strap increases. The slack 80a is pulled out of the vent strap 60a and the vent strap moves from the first condition to the second condition. The second vent opening 72a in the vent strap 60a is moved out of alignment with the first vent opening 42a in the vent panel 40a, and the vent 42a is closed, blocking flow of inflation fluid out of the air bag 10a through the first vent opening.

From the above description of the invention, those skilled in the art will perceive improvements, changes and modifications in the invention. Such improvements, changes and modifications within the skill of the art are intended to be covered by the appended claims.

I claim:

1. A vehicle occupant protection apparatus comprising:
   an inflatable vehicle occupant protection device having a deflated condition and an inflated condition, said device having a vent panel defining a first vent opening for enabling flow of inflation fluid out of said device;
   a vent strap having a second vent opening movable relative to said first vent opening;
   said vent strap having opposite first and second ends that are fixed when said protection device is in the deflated condition;
   said vent strap having slack due to the length of said strap being greater than the distance between the locations where its opposite ends are fixed;
   one of said ends of said vent strap moving as said protection device is inflated to remove said slack and move said second vent opening relative to said first vent opening;
   an actuatable holding mechanism for holding said one of said ends of said vent strap and, for when actuated, releasing said one of said ends of said vent strap to permit movement of said one of said ends of said vent strap; and
   a sensor means for sensing a condition requiring actuation of said holding mechanism to permit movement of said one of said ends of said vent strap.

2. Apparatus as set forth in claim 1 further including an inflator for directing inflation fluid into said protection device to inflate said protection device, said first end of said vent strap being fixed adjacent said inflator and said second end of said vent strap being fixed to said vent panel, said second end of said vent strap moving with said vent panel upon inflation of said protection device away from said inflator when said device inflates.

3. Apparatus as set forth in claim 1 wherein said second vent opening is movable relative to said first vent opening between a first position when said device is in the inflated condition in which said second vent opening is aligned with said first vent opening, and a second position when said device is in the inflated condition in which said second vent opening is not aligned with said first vent opening.

4. Apparatus as set forth in claim 3 wherein said first and second vent openings are aligned when said device is in the deflated condition thereby to enable flow of inflation through said first vent opening.

5. Apparatus as set forth in claim 3 wherein said first and second vent openings are not aligned when said device is in the deflated condition thereby to block flow of inflation through said first vent opening.

6. Apparatus as set forth in claim 1 further comprising a tether in said protection device, said first end of said vent strap being fixed to said tether, said tether being tensioned upon inflation of said protection device beyond a predetermined amount to remove said slack from said vent strap to cause said second vent opening to move relative to said first vent opening.

7. Apparatus as set forth in claim 6 further including an inflator for inflating said protection device, and wherein said first end of said vent strap is fixed to an intermediate portion of said tether at a location spaced apart from said inflator.

8. A vehicle occupant protection apparatus comprising:
   an inflatable vehicle occupant protection device having a deflated condition and an inflated condition, said device having a vent panel defining a first vent opening for enabling flow of inflation fluid out of said device;
   a vent strap having a second vent opening movable relative to said first vent opening;
   said vent strap having opposite first and second ends that are fixed when said protection device is in the deflated condition;
   said vent strap having slack due to the length of said strap being greater than the distance between the locations where its opposite ends are fixed;
   one of said ends of said vent strap moving as said protection device is inflated to remove said slack and move said second vent opening relative to said first vent opening;
   sensor means for sensing a condition requiring venting of inflation fluid from said device when said device inflates; and
   a holding mechanism having a first condition in response to said sensor means sensing a condition requiring venting of inflation fluid from said device and having a second condition in response to said sensor means not sensing a condition requiring venting of inflation fluid from said device;
   said holding mechanism when in the first condition holding said second end of said vent strap with said second vent opening in the first position thereby enabling flow of inflation fluid out of said device through said first vent opening;
   said holding mechanism when in the second condition releasing said second end of said vent strap for movement with said vent panel with said second vent opening in the second position when said device inflates.

9. A vehicle occupant protection apparatus comprising:
   an inflatable vehicle occupant protection device having a deflated condition and an inflated condition, said device having a vent panel defining a first vent opening for enabling flow of inflation fluid out of said device;
   a vent strap having a second vent opening movable relative to said first vent opening;
   said vent strap having opposite first and second ends that are fixed when said protection device is in the deflated condition;
   said vent strap having slack due to the length of said strap being greater than the distance between the locations where its opposite ends are fixed;

one of said ends of said vent strap moving as said protection device is inflated to remove said slack and move said second vent opening relative to said first vent opening;

a vent strap retainer fixed to said vent panel adjacent said first vent opening, said vent strap extending between said retainer and said vent panel, said retainer having a third opening aligned with said first vent opening in said vent panel, said vent strap having a venting position when said device is in the inflated condition in which said second vent opening is aligned with said first vent opening and said third opening thereby enabling flow of inflation fluid out of said device through said first vent opening; and said vent strap having a blocking position when said device is in the inflated condition in which said second vent opening is not aligned with said first vent opening and said third opening thereby blocking flow of inflation fluid out of said device through said first vent opening;

said vent strap moving between the venting position and the blocking position in response to inflation of said inflatable device.

10. A vehicle occupant protection apparatus comprising:

an inflatable vehicle occupant protection device having a deflated condition and an inflated condition, said device having a vent panel defining a first vent opening for enabling flow of inflation fluid out of said device;

a vent strap having a second vent opening movable relative to said first vent opening;

said vent strap having opposite first and second ends that are fixed when said protection device is in the deflated condition;

said vent strap having slack due to the length of said strap being greater than the distance between the locations where its opposite ends are fixed;

one of said ends of said vent strap moving as said protection device is inflated to remove said slack and move said second vent opening relative to said first vent opening;

a tether in said protection device, said first end of said vent strap being fixed to said tether, said tether being tensioned upon inflation of said protection device beyond a predetermined amount to remove said slack from said vent strap to cause said second vent opening to move relative to said first vent opening;

a vent strap retainer for guiding movement of said vent strap relative to said vent panel, said strap retainer and said vent panel defining a gap through which said vent strap is slidable upon inflation of said protection device beyond a predetermined amount.

11. A vehicle occupant protection apparatus comprising:

an inflatable vehicle occupant protection device having an inflatable volume defined at least in part by a panel having an inner surface facing the inflatable volume and an outer surface facing the atmosphere, said inflatable volume having a deflated condition and an inflated condition, said panel defining a first vent opening for directing flow of inflation fluid to the atmosphere;

a vent strap having a second vent opening movable relative to said first vent opening, said first and second vent openings having an aligned condition directing inflation fluid flow to atmosphere and a second condition blocking inflation fluid flow to atmosphere;

said vent strap having opposite first and second ends that are fixed when said protection device is in the deflated condition;

said vent strap having slack due to the length of said strap being greater than the distance between the locations where its opposite ends are fixed;

one of said ends of said vent strap moving as said protection device is inflated to remove said slack and move said second vent opening relative to said first vent opening from one of said conditions to the other of said conditions.

* * * * *